D. C. TEETOR.
DISPLAY APPARATUS.
APPLICATION FILED MAR. 10, 1915.

1,224,512.

Patented May 1, 1917.
6 SHEETS—SHEET 1.

D. C. TEETOR.
DISPLAY APPARATUS.
APPLICATION FILED MAR. 10, 1915.

1,224,512.

Patented May 1, 1917.
6 SHEETS—SHEET 3.

Witnesses:

Inventor
Dan C. Teetor.

D. C. TEETOR.
DISPLAY APPARATUS.
APPLICATION FILED MAR. 10, 1915.

1,224,512.

Patented May 1, 1917.
6 SHEETS—SHEET 6.

Witnesses:

Inventor:
Dan'l C. Teetor.

UNITED STATES PATENT OFFICE.

DAN C. TEETOR, OF HAGERSTOWN, INDIANA.

DISPLAY APPARATUS.

1,224,512.   Specification of Letters Patent.   Patented May 1, 1917.

Application filed March 10, 1915. Serial No. 13,316.

*To all whom it may concern:*

Be it known that I, DAN C. TEETOR, citizen of the United States, residing at Hagerstown, in the county of Wayne and State of Indiana, have invented a certain new and useful Improvement in Display Apparatus, of which the following is a full, clear, concise, and exact description, reference being had to the accompanying drawings, forming a part of this specification.

My invention relates to display apparatus and in many of its features to that class of display apparatus in which display slides are assembled in groups to each of which slides are transferred from the other.

The invention has for one of its objects the provision of means where especially provided power actuating pushers are eliminated for pushing the groups of slides in the slide transferring process. In carrying out this feature of my invention the slides themselves act to push the groups to which they are transferred and desirably have such formation as to bring about that pushing relation with the groups to be pushed upon their transfer to such groups. This formation of the slides initially effects the introduction of the slides being transferred to the groups that are temporarily to contain them, a slide in initially being brought into association with a group and during the completion of its transfer coöperating with means for bodily pushing the slides of the group to which transfer is being effected.

The invention has for another of its objects the provision of an improved form of tray whereby variation in structural formation and dimensions of the slides will not render the machine inoperative.

The invention has for another of its objects the provision of such interengagement between the groups of slides and the tray supporting the same that slides may be passed to and from the groups thereof without disturbing the alinement of the balance of the slides in such groups.

The invention has for another of its objects the provision of means for operatively positioning the slides upon the tray while out of the interlocking engagement therewith that I preferably employ.

The invention has for another of its objects the provision of means for adjusting the effective length of the tray and for preventing the outward longitudinal movement of the slides undergoing transfer, in the wrong direction.

The invention has for still another of its objects the provision of means whereby the actuating traveling pawls which I preferably employ for effecting the transfer of the slides will not be permitted materially to retract transferred slides when the pawls are traveling in reverse directions.

My invention has other features and all of the features thereof will be fully set forth by reference to the accompanying drawings showing the preferred embodiment thereof and in which.

Like parts are indicated by similar characters of reference throughout the different figures.

The apparatus is desirably so constructed that it may be viewed from either of its broad vertical sides and the description which follows is inclusive of the operation of the apparatus when viewed in either direction.

Figure 1:
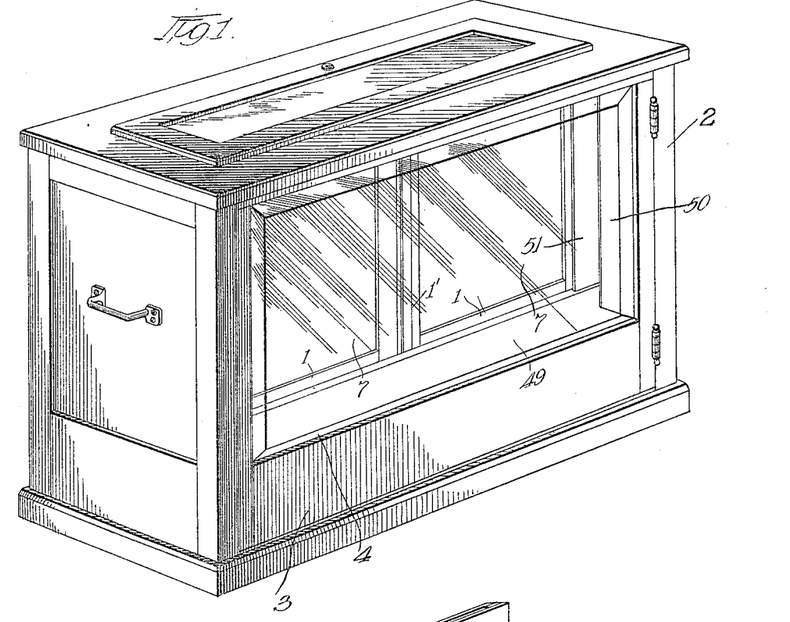
Figure 1 is a perspective view of one embodiment of the invention.
Figure 7:
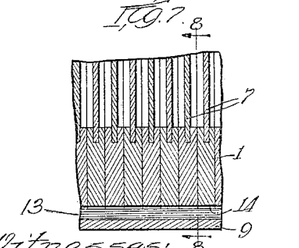
Fig. 7 is a detail, in section, on line 7 7 of Fig. 6.
Figure 8:
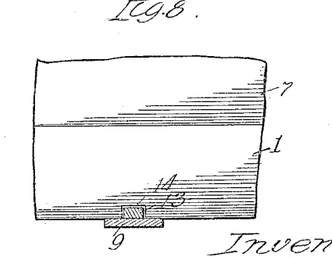
Fig. 8 is a sectional view on line 8 8 of Fig. 7.
Figure 9:
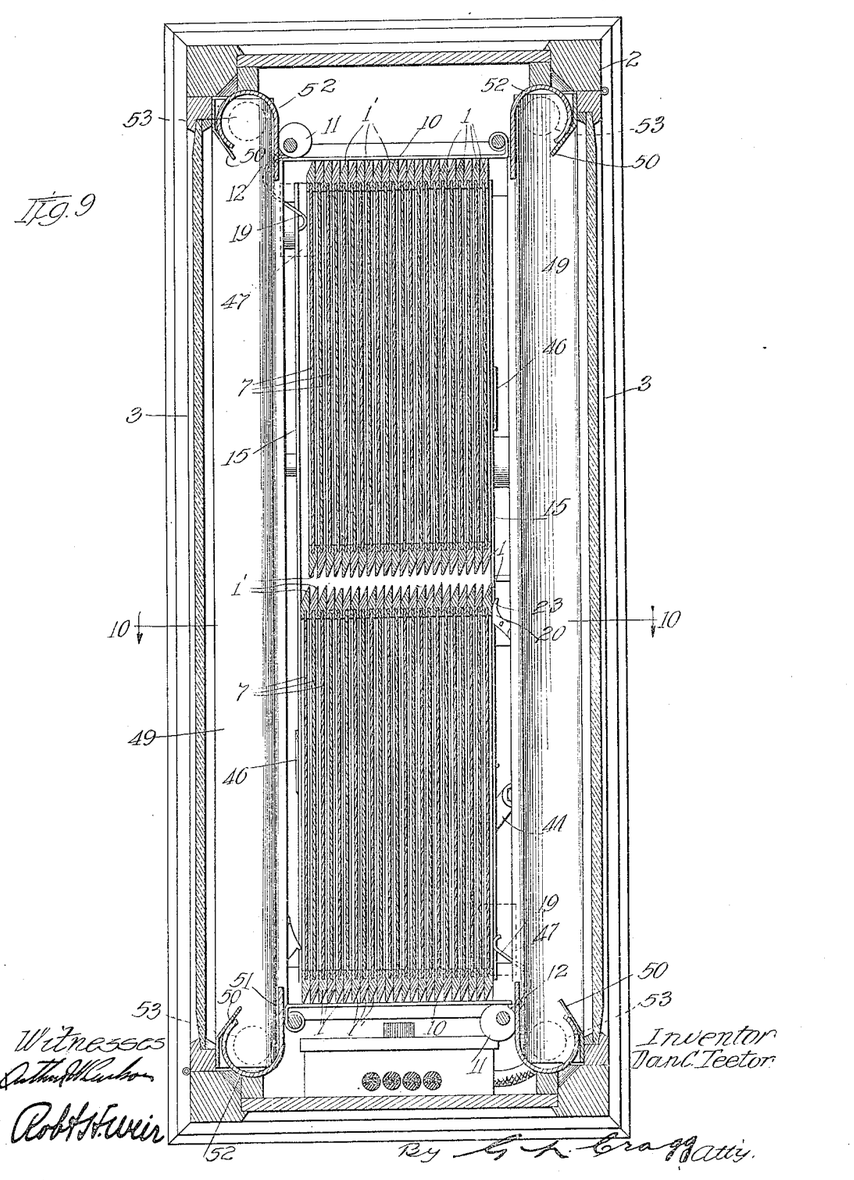
Fig. 9 is a view on line 9 9 of Fig. 6.

The display slides 1 are disposed in two parallel groups so related that a slide at one end of each group may be transferred to the adjacent end of the adjacent group. The casing 2 which incloses the slides and the mechanism for operating the same preferably has a display opening at the front and rear, which openings are desirably closed as indicated in Fig. 1 where there is shown a door 3 at the front of the machine having a transparent glass panel 4. The slides are shown as being in the form of frames having grooves 6 in which display cards 7 may be removably received, the frames being provided with slots 8 through their top rails to permit of the insertion and removal of the display cards. The invention is not to be limited, however, to slides which are composed of frames and cards. The slides are supported upon a tray or support 9 which is sufficiently long to enable them to be disposed thereon in closely approximated spaced apart groups as illustrated clearly in Fig. 9. The end walls 10 of the tray are respectively pivoted at diagonally opposite corners of the tray, the free ends of these walls being associated with eccentrics 11 whereby the effective length of the tray may be regulated. Adjustment of the end walls 10 of the tray effected by the eccentrics 11 is maintained by the set screws 12. The alinement of the slides in each group is generally maintained by interengaging formations of the bottom rails of the slide frames and the tray, these interengaging formations being desirably in the nature of stationary rails 13 upon the top side of the tray and notches 14 (Figs. 7 and 8) in the bottom rails of the slides, the rails 13 and said notches being disposed transversely of the tray. The rails 13 and notches 14 also take part in guiding the bodily movement of the groups of slides individual thereto, sufficient spacing existing between the longitudinal walls 15 of the tray and the adjacent square or blunt ends of the rails 13 to permit of the travel of slides from group to group longitudinally of the tray, the actuating mechanism being preferably such that the slide upon the left (whether the machine be viewed from the front or rear) is moved to the right whereby the slides at the left are successively presented to view. The rail 13 at the right, as the machine is viewed, is provided with an entering wedge formation 16 at its end nearer the observer to direct the slide newly placed in the right hand group into interlocking engagement at its notch 14 with the rail 13 then associated therewith. The end 17 of each rail nearer the observer and at which each slide to be transferred takes its departure is blunt or square and is completely cleared by the slide to be transferred before such transfer is commenced. One eccentric 11 is disposed upon each side of the machine to be nearly in longitudinal alinement with the blunt end 17 of the adjacent rail 13 whereby the slide which is to undergo transfer and which is cleared from the rail 13 for this purpose may not be moved to the left whereby the cleared slide is maintained in proper relation with the mechanism that is to effect its transfer.

Each longitudinal tray wall 15 is desirably angular in formation, these walls being arranged each to have a bottom wing underlying the body portion of the tray and an upright wing that constitutes a longitudinal wall proper of the tray. Each longitudinal tray wall 15 is preferably attached only at one end to the body portion of the tray and to the end of the tray body remote from the blunt rail end 17 whereby the spacing between such blunt end and longitudinal wall may be automatically varied for a purpose shortly to be set forth. Each wall 15 is connected by a spring 18 with the body portion of the tray whereby the longitudinal walls are held as closely to the body portion of the tray as the bulk of the two groups of slides will permit. By this arrangement the presence of slides (which are generally in the form of wooden frames) which vary slightly in dimensions and formation in their manufacture will not render the apparatus inoperative since such variation is permitted by the springs 18 that cause and permit the width of the tray between these longitudinal walls automatically to be varied, the springs 18 maintaining the longitudinal tray walls sufficiently close to the blunt ends of the rails to prevent more than one slide from being located in the spacing between each blunt end 17 and the adjacent longitudinal wall 15, that is to allow but one slide to be disengaged from its rail 13 at a time for the purpose of transfer. I provide spring fingers 19 adjacent the free ends of the longitudinal walls 15, and for convenience mounted upon the free ends of the walls 10, for the purpose of bearing upon the slide immediately behind the slide undergoing transfer, to prevent the slide back of the one being transferred from clearing associate rail 13 until the transferring movement has been nearly completed. The slides are provided with formations $1^1$ which enable the slide being transferred to coöperate with the foremost slide of the group to which the transfer is made bodily to move this group rearwardly with reference to the observer the width or thickness of the transferred slide, the anchored end of the adjacent longitudinal wall 15 (which anchored end is in front of the group to which the transfer is to be made) also coöperating with the transferred slide to effect the bodily shifting of this group. Because of the formation $1^1$ I dispense with especial pushing mechanism for pushing the groups of slides in the transferring operation and constitute the slides themselves mechanism for performing this function. The slides are divided into groups of equal number, not counting the slide which is to undergo transfer. That is, during the interval of non-transfer, there is one more slide in one group than in the other and it is from the group of greater number that the transfer is to be effected, the extra slide acting in lieu of especially employed group pushers.

Figure 12:
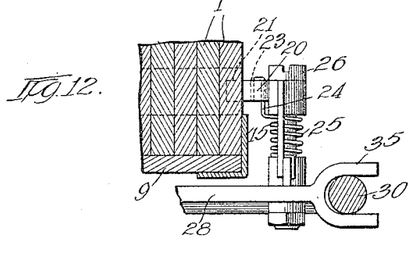
Fig. 12 is a sectional view of a part of the structure on line 12 12 of Fig. 6.
Figure 13:
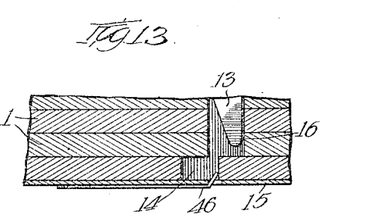
Fig. 13 is a view of part of the structure on line 13 13 of Fig. 6.
Figure 14:
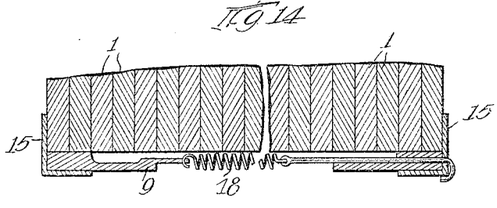
Fig. 14 is a sectional view of a part of the structure on line 14 14 of Fig. 5.

Any suitable means may be employed for effecting the transfer of slides, the preferred means including a traveler upon each side of the apparatus. Each of these travelers desirably includes a spring pressed actuating pawl 20 with an angular nose having one branch 21 for reception within apertures 22 which are desirably provided in the bottom rails of the frames or slides to enable the slides to be engaged by the pawls. The outer branch of each nose limits the extent to which the inner branch 21 may be projected within the coöperating aperture 22 whereby the engagement of the pawl is limited to one slide at a time. The spring 24 which presses the pawl into operating engagement with the slides is preferably of a composite formation one part serving to press the pawl while the anchored end of the spring is in the form of a coil 25 which maintains the pawl in engagement with the lower face of a screw 26, which screw may be adjusted to determine the plane of operation of the pawl and thereby bring the pawl into proper operating relation with the apertures 22. Each pawl is pivotally mounted upon a pawl carrier having angularly related branches 27 and 28 each carrying a pawl, the branch 27 extending transversely of the tray and the branch 28 extending longitudinally of the tray. The pawl carrier is, by means of mechanism to be described, reciprocated longitudinally of the machine and is guided in its reciprocations by longitudinal guide rods 29 and 30, one adjacent each longitudinal side of the tray, these guide rods also desirably constituting side rails of a subframe 31 on which the motor and operating gearing are mounted and which subframe 31 in turn is mounted upon the bottom of the casing or cabinet 2. The tray has eyes 32 through which the rods 29 and 30 pass and which eyes are adjustable longitudinally of the rods 29 and 30 in order that the positions of the tray and the parts carried thereby may be adjusted with respect to the actuating pawls and their carrier, any selected adjustment which is brought about for this purpose being maintained by the set screws 33. The pawl carrier itself has eyes 34 through which the rod 29 passes and a bifurcated guide 35 between whose branches the rod 30 passes, ample clearance existing between the rod 30 (Fig. 12) and the base of the guide 35 whereby accurate spacing and parallelism between the rods 29 and 30 is not required in order that the pawl carrier may freely move. The prime mover of the apparatus is desirably an electric motor 36 which is in belt connection with a pulley 37 in driving relation with a worm 38 co-axial with said pulley and which worm is in mesh with a worm wheel 39 upon whose shaft there is fixed a crank 40. A bell crank 41 is pivoted at its elbow upon the outer end of the crank 40 and has bolt and slot connection 42 at one of its ends with the crank 40 whereby the relative position of the two cranks 40 and 41 may be adjustably fixed. The other end of the bell crank has connection with one end of a link 43 whose other end is in connection with an intermediate portion of an oscillating rocker arm 44. The rocker arm is connected with the pawl carrier by a link 45. By adjusting the bell crank the range of travel of the pawl carrier may be regulated within minor limits. By the transmission mechanism intervening between the motor and the pawl carrier said carrier is caused to reciprocate within a range that will properly effect the transfer of slides from group to group.

Figure 10:
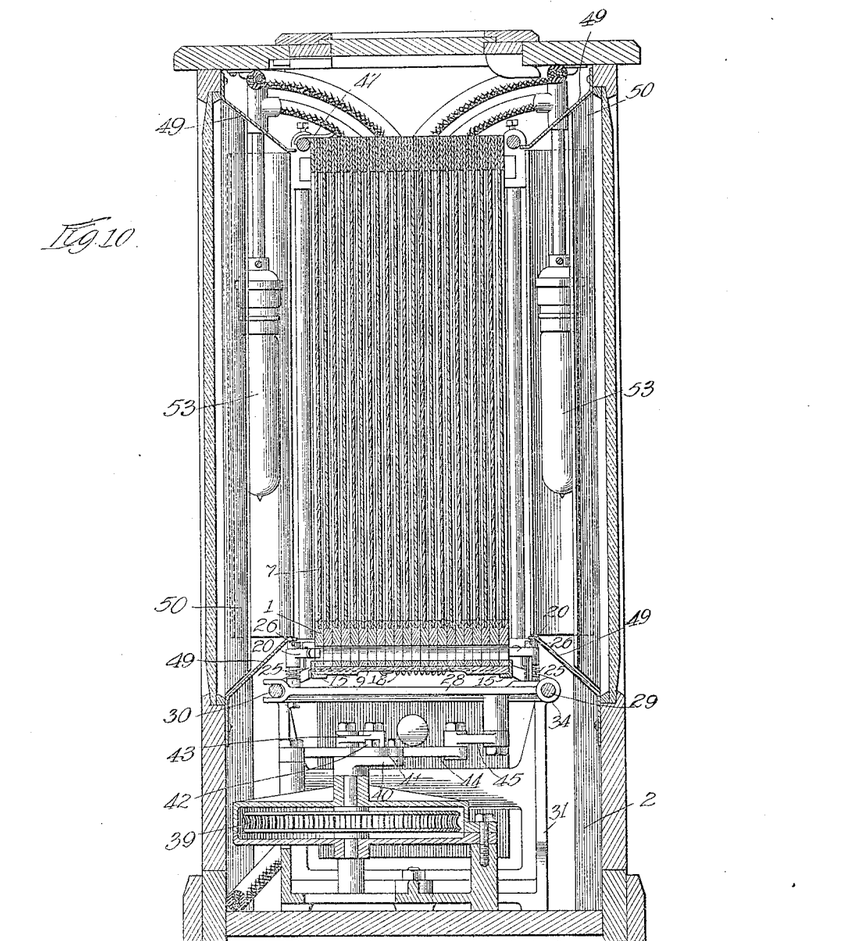
Fig. 10 is a view on line 10 10 of Fig. 9.
Figure 11:
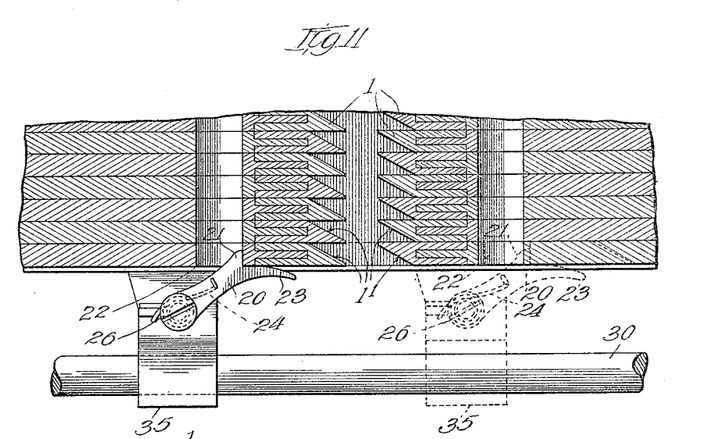
Fig. 11 is a sectional view of a part of the structure on line 11 11 of Fig. 6.

The actuating pawls desirably trail when moving to the left as the machine is viewed and are active when moving to the right whereby the observer upon either side of the machine will note the transfer of the slides from left to right. Each frame being transferred is engaged at its right hand hole 22 by the associate actuating pawl, one pawl trailing while the other is actuated. To prevent the return of the transferred slides to the group of which they were previously parts, I provide a detent preferably in the form of a leaf spring 46 upon each longitudinal side 15 of the tray, the free end of this leaf spring projecting through an aperture in the wall carrying it to enter the notch 14 of the transferred frame to prevent the associate pawl from drawing this frame with it upon the return movement of the pawl. An insetting guard 47 is provided upon each side of the machine, being positioned as indicated in Fig. 10 and by dotted lines in Fig. 9, these guards being located over the slides next to be transferred and a few slides adjacent the same and at opposite ends of the machine whereby a slide undergoing transfer and several slides adjacent thereto cannot be tilted, the result being further to preserve the slides in their groupings as well as to prevent maladjustment of the slides undergoing transfer.

Figures 2, 3:
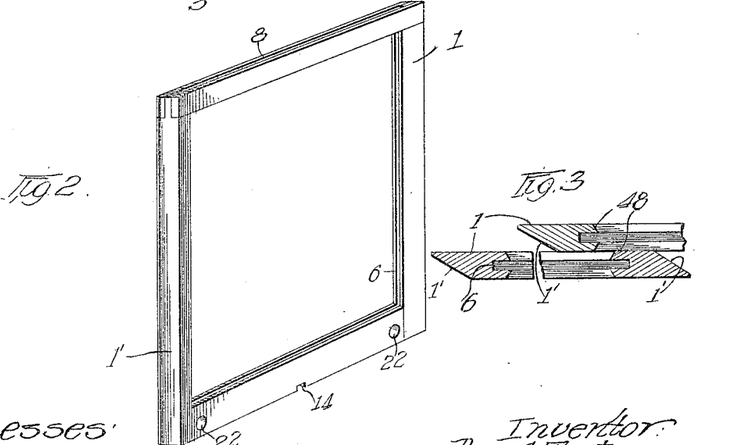
Fig. 2 is a perspective view of one of the slides.
Fig. 3 is a view illustrating certain relationship of two slides one of which is being transferred to the series containing the other.
Figure 4:
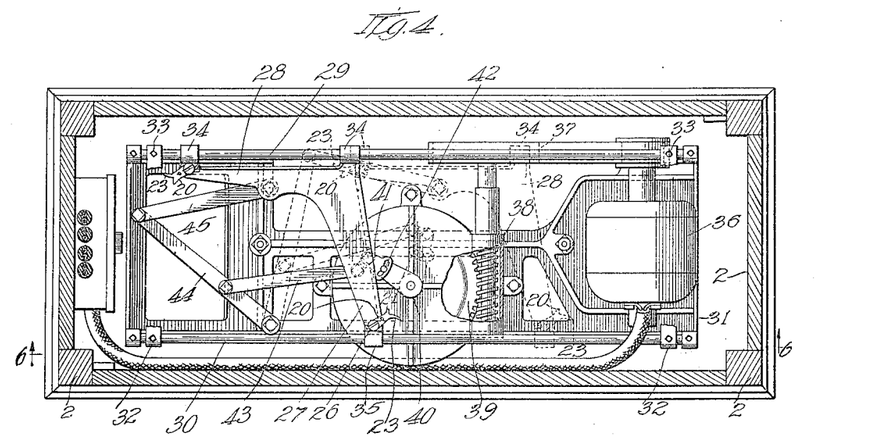
Fig. 4 is a view on line 4 4 of Fig. 6, an alternative position being indicated by dotted lines.
Figure 5:
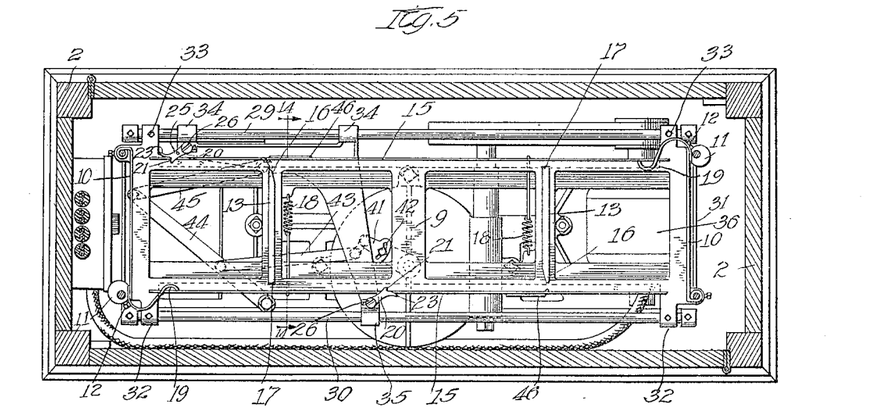
Fig. 5 is a view on line 5 5 of Fig. 6.
Figure 6:
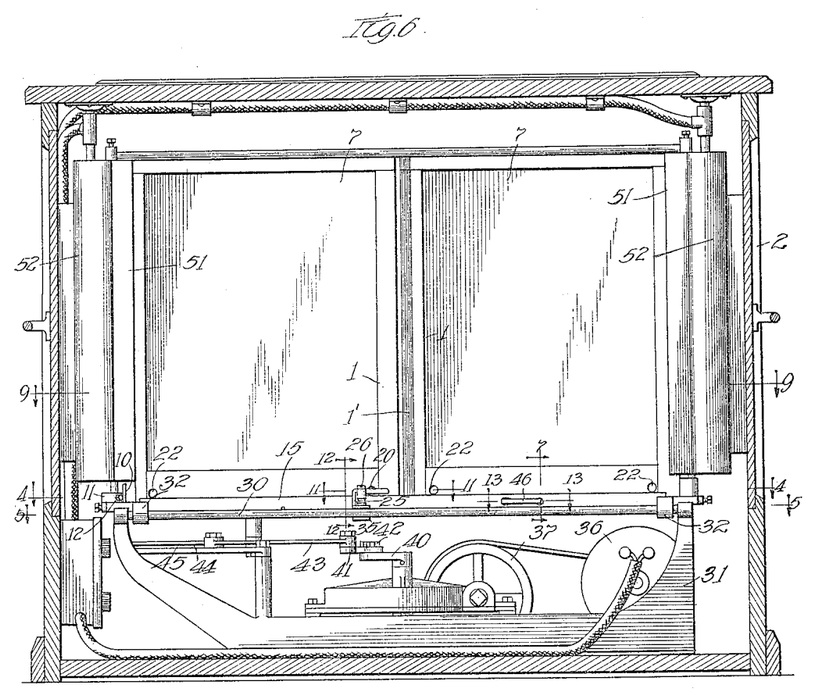
Fig. 6 is a view on line 6 6 of Fig. 4.

The formations $1^1$ provided upon the slides are in the nature of wedges, these wedges being desirably produced by beveling the vertical sides of each slide in parallel directions. Each slide that is to undergo transfer is brought into the same plane with the foremost slide of the group to which the former slide is to be transferred whereby the two adjacent wedge surfaces $1^1$ of these two adjacent sides are caused to interact, the slide which is being carried by the traveler 20 to the right (as the machine is viewed by the observer) having its right hand wedge portion $1^1$ engaged with the left hand wedge portion $1^1$ of the foremost slide in the right hand group whereby this latter slide and the group of which it is a part are forced rearwardly, the adjacent longitudinal wall 15 of the tray preventing material outward movement of the slide undergoing transfer and co-acting with this slide to effect the bodily movement of the group of which the slide being transferred is to form a part. I am thus enabled to use the slides themselves as component parts of the machine, the transferring movement being also productive of the shifting movement of the right hand group of slides without the aid of any supplemental pusher, though I do not wish to be limited, in all embodiments of the invention, to slide positioning wedge formations which are carried by the slides. I am aware that it is old to form the vertical rails of display slides of wedge shape but machines employing such slides have also employed especially provided power driven pushers inasmuch as the prior wedge shaped vertical rails of the display frames did not and could not operate as herein set forth. In other words the wedge shaped rails of the prior art were merely provided to afford suitable spacing for the proper engagement of the actuating pawls. To prevent the inner vertical margins of frames that are in passing relating to each other from coming into abutting engagement that would result in stoppage and possible breakage of the machine I bevel the inner corners of the vertical rails of the frame 1 as indicated at 48 (Fig. 3) so that if one frame or its contents does come into the plane of another slide the bevels 48 of these frames or one of them will prevent any effective interlocking or abutting engagement.

Each door 3 carries two inwardly converging horizontal reflectors 49 and two inwardly converging reflectors 50, these latter reflectors coöperating with the stationary vertical reflectors 51 to form complements to the reflectors 49 to constitute an effective frame for the matter which is changeably displayed. The reflectors 51 terminate behind the reflectors 50 in split cylinders 52 in which incandescent lamps 53 are disposed whereby light for illuminating the display area finds passage between the reflector elements 51 and 50. The reflectors 49, 50 and 51 are desirably so located as to conceal all of the mechanism excepting the wedge formations 1¹ of the slides.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following;—

1. Display apparatus including a support; a plurality of slides arranged upon said support in two groups; and mechanism for effecting transfer of slides from group to group, said support and slides respectively having interengaging rails and notches for maintaining the slides that are not undergoing transfer in alinement, said support having two longitudinal walls spaced apart from the ends of said rails to permit of the transfer of slides from group to group, that end of each rail at the end of each group where slides are introduced being of entering wedge formation.

2. Display apparatus including a support; a plurality of slides arranged upon said support in two groups; and mechanism for effecting transfer of slides from group to group, said support and slides respectively having interengaging rails and notches for maintaining the slides that are not undergoing transfer in alinement, said support having two longitudinal walls spaced apart from the ends of said rails to permit of the transfer of slides from group to group, said walls being each anchored at one end adjacent the rail end where transferred slides are first engaged and free to swing at the other and having means for forcing them inwardly.

3. Display apparatus including a support; a plurality of slides arranged upon said support in two groups; and mechanism for effecting transfer of slides from group to group, said support and slides respectively having interengaging rails and notches for maintaining the slides that are not undergoing transfer in alinement, said support having two longitudinal walls spaced apart from the ends of said rails to permit of the transfer of slides from group to group, that end of each rail at the end of each group where slides are introduced being of entering wedge formation, said walls being each anchored at one end adjacent the rail end where transferred slides are first engaged and free to swing at the other and having means for forcing them inwardly.

4. Display apparatus including a support; a plurality of slides arranged upon said support in two groups; and mechanism for effecting transfer of slides from group to group, said support and slides respectively having interengaging rails and notches for maintaining the slides that are not undergoing transfer in alinement, said support having two longitudinal walls spaced apart from the ends of said rails to permit of the transfer of slides from group to group, said walls being each anchored at one end adjacent the rail end where transferred slides are first engaged and free to swing at the other and having spring means for forcing them inwardly.

5. Display apparatus including a support; a plurality of slides arranged upon said support in two groups; and mechanism for effecting transfer of slides from group to group, said support and slides respectively having interengaging rails and notches for maintaining the slides that are not undergoing transfer in alinement, said support having two longitudinal walls spaced apart from the ends of said rails to permit of the transfer of slides from group to group, that end of each rail at the end of each group where slides are introduced being of entering wedge formation, said walls being each anchored at one end adjacent the rail end where transferred slides are first engaged and free to swing at the other and having spring means for forcing them inwardly.

6. Display apparatus including a support; a plurality of slides arranged upon said support in two groups; and mechanism for effecting transfer of slides from group to group, said support having two longitudinal walls swingingly mounted respectively at diagonally opposite portions of the support, these walls having means for pressing the free ends thereof inwardly.

7. Display apparatus including a support; a plurality of slides arranged upon said support in two groups; and mechanism for effecting the transfer of slides from group to group, said support having end walls which are swingingly mounted at diagonally opposite portions of the support, these end walls being provided with means for maintaining them in adjustment.

8. Display apparatus including a support; a plurality of slides arranged upon said support in two groups; mechanism for effecting transfer of slides from group to group which is inclusive of a traveler; a carrier for the traveler; and two longitudinally disposed rods on opposite sides of the machine, said carrier having two eyes through which one of said rods passes and a bifurcated guide between whose branches the other rod passes.

In witness whereof, I hereunto subscribe my name this sixth day of February A. D., 1915.

DAN C. TEETOR.

Witnesses:
RAY TEETER,
WILLIAM E. IMMEL.

Copies of this patent may be obtained for five cents each, by addressing the "Commissioner of Patents, Washington, D. C."